(12) United States Patent
Millar et al.

(10) Patent No.: US 10,836,587 B2
(45) Date of Patent: Nov. 17, 2020

(54) SYSTEMS AND METHODS FOR CLEANING A TRAY IN A GROW POD

(71) Applicant: Grow Solutions Tech LLC, Vineyard, UT (US)

(72) Inventors: Gary Bret Millar, Highland, UT (US); Mark Gerald Stott, Eagle Mountain, UT (US); Todd Garrett Tueller, American Fork, UT (US); Michael Stephen Hurst, Farmington, UT (US); Alan Ray Bentley, Alpine, UT (US); Taylor John Woodbury, Provo, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 0 days.

(21) Appl. No.: 16/545,606

(22) Filed: Aug. 20, 2019

(65) Prior Publication Data

US 2020/0039755 A1 Feb. 6, 2020

Related U.S. Application Data

(63) Continuation of application No. 15/926,746, filed on Mar. 20, 2018, now Pat. No. 10,421,618.
(Continued)

(51) Int. Cl.
*B65G 45/22* (2006.01)
*B65G 17/00* (2006.01)
(Continued)

(52) U.S. Cl.
CPC .............. *B65G 45/22* (2013.01); *A01G 9/06* (2013.01); *A01G 9/143* (2013.01); *B65G 17/002* (2013.01);
(Continued)

(58) Field of Classification Search
CPC .......... A01G 9/14; A01G 9/143; A01G 31/04; A01G 9/06; A01G 31/042; A01G 7/045;
(Continued)

(56) References Cited

U.S. PATENT DOCUMENTS

| 3,327,425 A | 6/1967 | Dosedla et al. |
| 3,432,965 A | 3/1969 | Smith et al. |

(Continued)

FOREIGN PATENT DOCUMENTS

| CN | 202657684 | 1/2013 |
| CN | 103202193 | 7/2013 |

(Continued)

OTHER PUBLICATIONS

PCT International Search Report and Written Opinion of the International Searching Authority for PCT/US2018/023825, dated Jun. 26, 2018, 17 pages.

*Primary Examiner* — James R Bidwell
(74) *Attorney, Agent, or Firm* — Dinsmore & Shohl LLP

(57) ABSTRACT

Embodiments disclosed herein generally relate to systems and methods for emptying and/or cleaning a tray within an assembly line grow pod. In one embodiment, a sanitizer component for cleaning a tray coupled to a cart in an assembly line grow pod is disclosed. The sanitizer component is coupled to a track such that the cart and the tray are received in the sanitizer component via the track. The sanitizer component comprises a first actuator arm positioned underneath the track and extendable through an opening in the track and an aperture at a bottom end of the cart to contact the tray such that the tray rotates in a first direction. The sanitizer component further includes an actuator motor coupled to the first actuator arm for extend- (Continued)

ing the first actuator arm and a controller. The controller is communicatively connected to the actuator motor in the sanitizer component.

20 Claims, 7 Drawing Sheets

Related U.S. Application Data

(60) Provisional application No. 62/519,442, filed on Jun. 14, 2017, provisional application No. 62/519,304, filed on Jun. 14, 2017.

(51) Int. Cl.
| | | |
|---|---|---|
| *A01G 9/06* | (2006.01) | |
| *B65G 21/18* | (2006.01) | |
| *A01G 9/14* | (2006.01) | |
| *A01G 31/04* | (2006.01) | |
| *B65G 47/96* | (2006.01) | |

(52) U.S. Cl.
CPC ............ *B65G 21/18* (2013.01); *A01G 31/042* (2013.01); *A01G 2009/1492* (2013.01); *B65G 47/965* (2013.01); *B65G 2201/0202* (2013.01); *B65G 2207/24* (2013.01)

(58) Field of Classification Search
CPC ............ A01G 2009/1492; B65G 21/18; B65G 47/96; B65G 45/22; B65G 17/002; B65G 47/965; B65G 2201/0202; B65G 2207/24; G01N 33/025
USPC .......................................................... 198/494
See application file for complete search history.

(56) References Cited

U.S. PATENT DOCUMENTS

| | | |
|---|---|---|
| 3,771,258 A | 11/1973 | Charney |
| 5,253,302 A | 10/1993 | Massen |
| 5,388,681 A | 2/1995 | Bonnet |
| 5,449,889 A | 9/1995 | Samardzija |
| 5,839,566 A | 11/1998 | Bonnet |
| 5,901,237 A | 5/1999 | Conrad |
| 6,168,006 B1 | 1/2001 | Bytow |
| 6,247,576 B1 | 6/2001 | Bonnet |
| 8,376,132 B2 * | 2/2013 | Scapaccino ........ B29D 30/0016 198/861.3 |
| 10,421,618 B2 * | 9/2019 | Millar ..................... B65G 21/18 |
| 2007/0256356 A1 | 11/2007 | Kap |
| 2010/0294318 A1 | 11/2010 | Newsom et al. |
| 2016/0212947 A1 | 7/2016 | Uchiyama |

FOREIGN PATENT DOCUMENTS

| | | |
|---|---|---|
| JP | H11335872 | 12/1999 |
| JP | 2010051256 | 3/2010 |
| WO | 0146048 | 6/2001 |
| WO | 2013066254 | 5/2013 |
| WO | 2016129674 | 8/2016 |

* cited by examiner

SYSTEMS AND METHODS FOR CLEANING A TRAY IN A GROW POD

CROSS-REFERENCE TO RELATED APPLICATION

This application is a continuation of and claims priority to U.S. patent application Ser. No. 15/926,746, filed Mar. 20, 2018 and entitled "SYSTEMS AND METHODS FOR CLEANING A TRAY IN A GROW POD," now issued as U.S. Pat. No. 10,421,618 on Sep. 24, 2019, which claims the benefit of U.S. Provisional Application Ser. No. 62/519,442, filed on Jun. 14, 2017 and Provisional Application Ser. No. 62/519,304, also filed on Jun. 14, 2017, which are incorporated by reference in their entireties.

TECHNICAL FIELD

Embodiments described herein generally relate to systems and methods for cleaning a tray that is traversing a track and specifically to embodiments for cleaning and/or sanitizing a tray as part of an assembly line grow pod.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Industrial grow pods have enabled growing of crops more efficiently and in a smaller amount of space than typically found in a farm. However, in order to repeatedly grow and harvest multiple crops, the carts and trays where the crop plants are grown have to be continuously emptied, cleaned and re-seeded in an assembly line manner. One of the pressing issues with a grow pod is how to clean the trays after the plants are harvested in order to ensure proper removal of any plant and particulate matter and water used for the prior crop plants, before the trays are re-seeded for the next crop. The process of cleaning the trays thoroughly is fundamentally important to the growth and development of the subsequent production of crops; however, it can be quite labor-intensive and time-consuming. An automated and efficient system for emptying and/or cleaning a tray within an assembly line grow pod is thus desirable.

SUMMARY

Embodiments disclosed herein generally relate to systems and methods for emptying and/or cleaning a tray within in an assembly line grow pod. In one embodiment, a method of cleaning a tray coupled to a cart placed on a track includes directing movement of the cart along the track into a sanitizer component and directing movement of a first actuator arm positioned underneath the track and extendable through an opening in the track and an aperture at the bottom of the cart such that the first actuator arm extends through the opening in the track and the aperture at the bottom of the cart to contact the tray such that the tray rotates in the first direction.

In another embodiment, a method of automatically cleaning a tray coupled to a cart placed on a track includes directing, by a control device, movement of the cart into a sanitizer component along the track. The method further includes transmitting, by the control device, one or more signals to cause a first actuator arm to extend through an opening in the track and an aperture at a bottom of the cart to contact the tray such that the tray rotates in a first direction. The method further includes transmitting, by the control device, one or more signals to rotate the tray in a second direction opposite the first direction.

In yet another embodiment, a method of cleaning a tray coupled to a cart placed on a track includes directing a first actuator arm positioned underneath the track at a sanitizer component to extend through an opening in the track and an aperture at the bottom of the cart to contact the tray such that the tray rotates in the first direction and removing material present on the tray.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein generally relate to systems and methods for emptying and/or cleaning a tray within an assembly line grow pod. Some embodiments are configured with an assembly line of plants in carts that follow a track, wrapping around a first axis in a vertically upward direction and a second axis in a vertically downward direction. The embodiments described herein utilize various stations and/or components for facilitating an automatic assembly line for repeatedly planting, growing and harvesting plants by utilizing carts and trays that traverse the track interconnecting the various stations and/or components. Before repeating, the trays may be emptied, cleaned, and/or sanitized. The systems and methods for emptying and/or cleaning the tray coupled to the cart in an assembly line grow pod incorporating the same is described in more detail below.

Figure 1A:
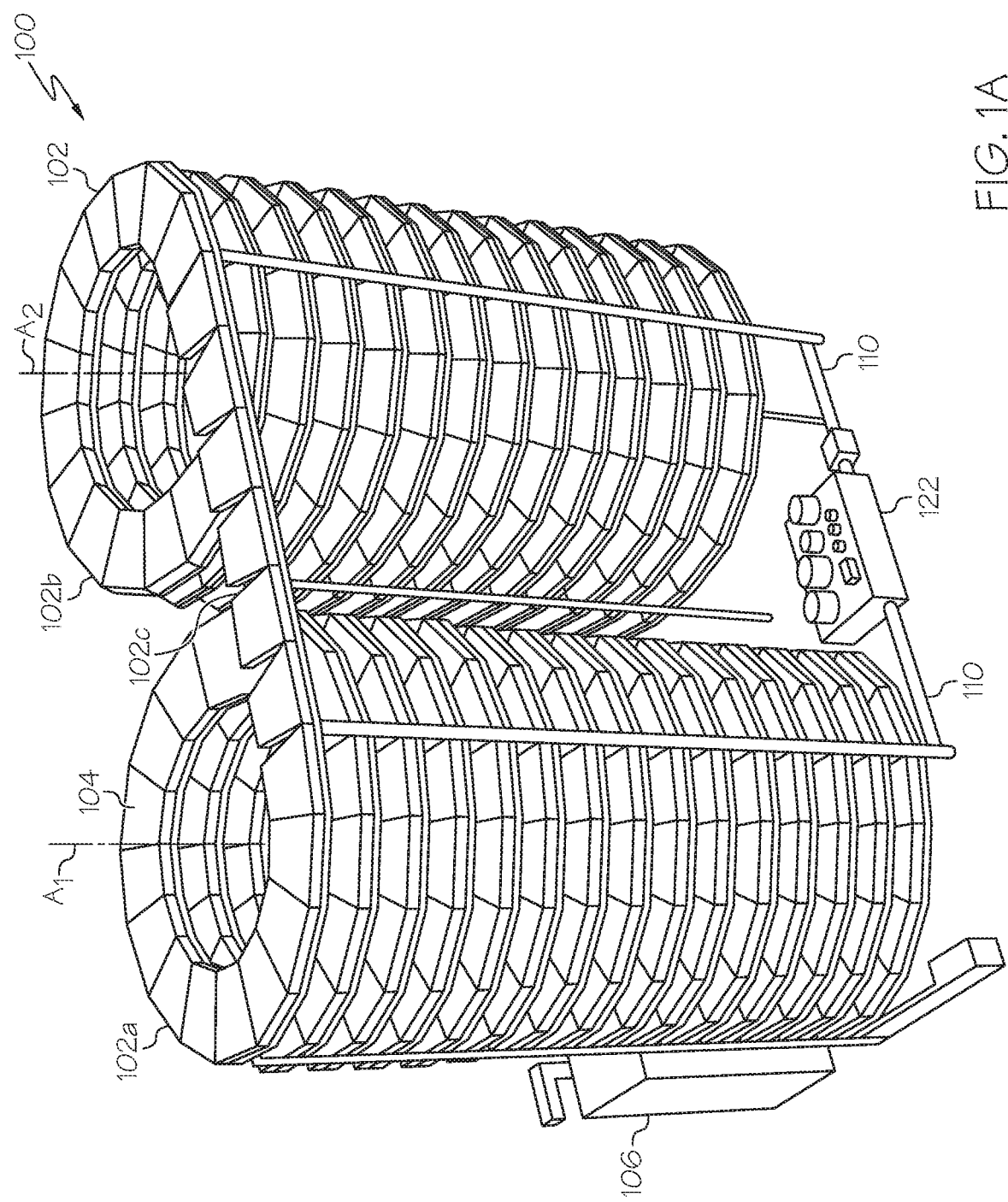
FIG. 1A depicts a first side perspective view of an illustrative assembly line grow pod, according to embodiments described herein.
Figure 1B:
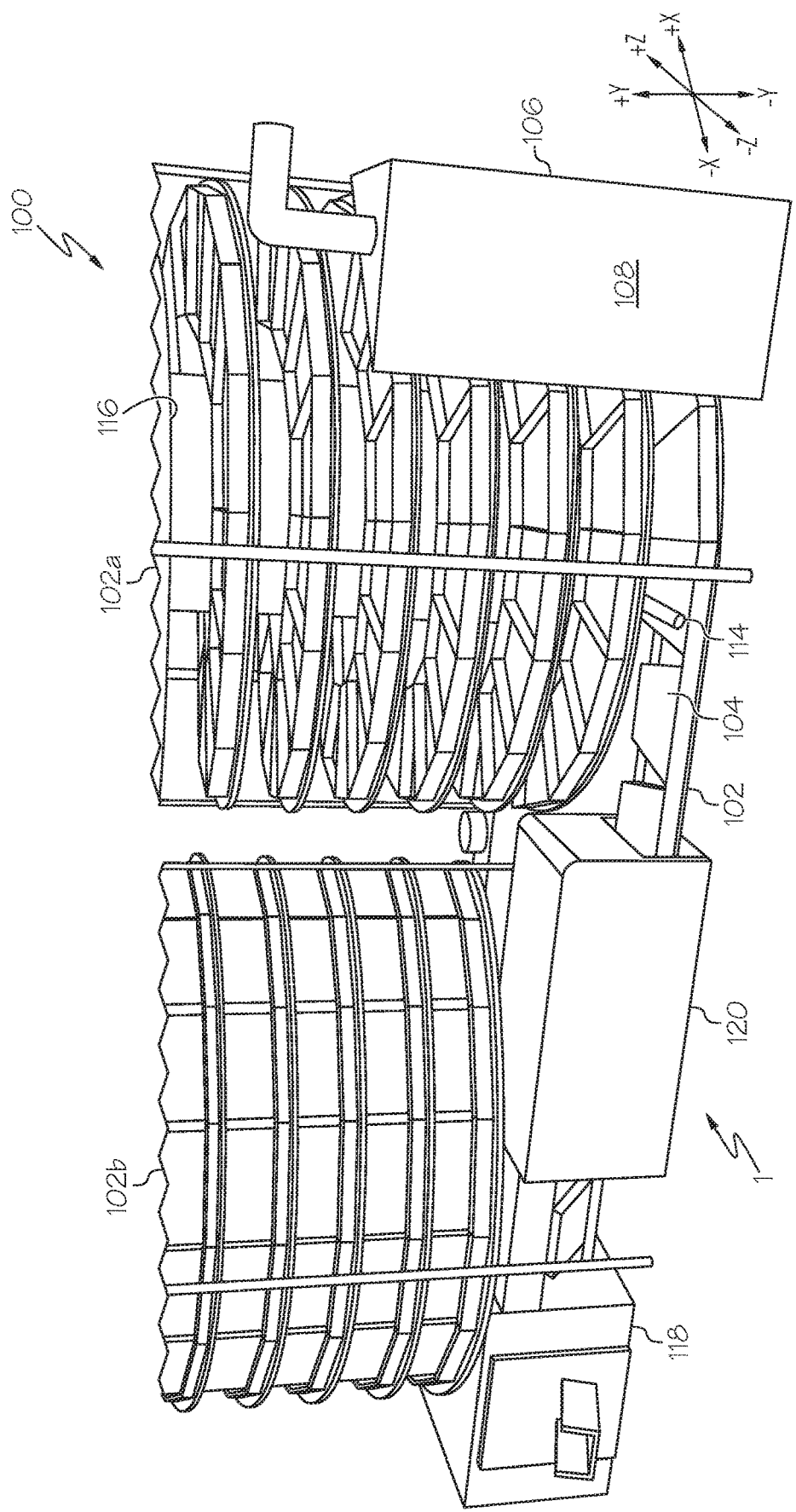
FIG. 1B depicts a second side perspective view of the illustrative assembly line grow pod, according to embodiments described herein.

Referring to the drawings, FIGS. 1A and 1B depict a first side perspective view and a second side perspective view respectively of an illustrative assembly line grow pod 100. A system 1 for emptying and/or cleaning a tray 105 passing through the assembly line grow pod 100 includes one or more carts 104 and a track 102 for holding the carts 104. The system 1 also includes a sanitizer component 120 for emptying and/or cleaning the tray 105 supported on each cart 104 and a controller 400 (shown in FIG. 4) communicatively connected to an actuator motor 210 (shown in FIG. 2) in the sanitizer component 120. The controller 400 is communicatively coupled to a master controller 106.

Still referring to FIGS. 1A and 1B, the track 102 includes an ascending portion 102a, a descending portion 102b, and a connection portion 102c in some embodiments. The track 102 wraps around (in a counterclockwise direction as shown in FIG. 1A and FIG. 1B, although clockwise or other configurations are also contemplated) a first axis $A_1$ such that the carts 104 ascend upwards in a vertical direction (i.e., in the +y direction of the coordinate axes of FIG. 1A). The connection portion 102c is relatively level (although this is not a requirement) and is utilized to transfer the carts 104 to the descending portion 102b. The descending portion 102b may be wrapped around a second axis $A_2$ (in a counterclockwise direction as shown in FIG. 1A and FIG. 1B, although clockwise or other configurations are also contemplated) that is substantially parallel to the first axis $A_1$, such that the carts 104 can descend towards the ground level in a vertical direction (i.e., in the −y direction of the coordinate axes of FIG. 1A). It should be understood that while the embodiments of FIGS. 1A and 1B depict an assembly line grow pod 100 that wraps around a plurality of axes, this is merely one example. Any configuration of the assembly line grow pod 100 or a stationary grow pod may be utilized for performing the functionality described herein. As shown in FIGS. 1A and 1B, the assembly line grow pod 100 includes the master controller 106. The master controller 106 may include a computing device and/or other hardware for controlling various components of the assembly line grow pod 100. As an example, a water distribution component, a nutrient distribution component, an air distribution component, etc. may be included as part of the master controller 106.

A watering component 122 is coupled to one or more water lines 110, which distribute water and/or nutrients to the carts 104 at predetermined areas of the assembly line grow pod 100. Water is stored in one or more fluid tanks 450 (shown in FIG. 3) which are fluidly connected to the sanitizer component 120 and/or the watering component 122 by the water lines 110. The fluid tanks 450 (i) provide water, nutrients, and/or other fluids for plant growth, (ii) provide fluid to the sanitizer component 120, (iii) collect used water from plant watering and/or used water from washing/sanitizing the carts 104, and/or (iv) store water and/or other fluids during a water recycling process. In some embodiments, water may be transferred between the fluid tanks 450 while undergoing water reconditioning or recycling processes. The recollection and recycling of water allows the assembly line grow pod 100 to efficiently use water and produce little or no wastewater. For example, without limitation, the used water may be recycled through the steps of coagulation, sedimentation, filtration, disinfection and storage.

In some embodiments, the carts 104 are advanced through at least a harvester component 118, the sanitizer component 120 and a seeder component 108 of the assembly line grow pod 100 along the track 102. The harvester component 118 harvests the plants on the tray 105. Once the plants are harvested in the harvester component 118, the carts 104 pass through the sanitizer component 120 for cleaning as described in greater detail herein. Once cleaned, the carts 104 advance to the seeder component 108, which determines if seeding is required and thereafter begins the process of seeding.

Accordingly, the sanitizer component 120 may be operatively connected in the assembly line grow pod 100 between the harvester component 118 and the seeder component 108 (shown in FIG. 1B). The sanitizer component 120 receives a cart 104 on the track 102 from the harvester component 118 after the plants on the tray 105 have been harvested. However, the sanitizer component 120 may also receive a cart 104 on an auxiliary track (not shown) that bypasses the harvester component 118. Such an auxiliary track may be utilized for a cart 104 that bypasses the harvester component 118 because the cart 104 includes seeds/plants that have been determined to be dead, contaminated, unsalvageable, etc. The sanitizer component 120 is utilized to empty the contents of the tray 105 containing unused plant matter, water, contaminants or the like as well as to clean and sanitize the tray 105 and/or cart 104, as described in greater detail herein.

Figure 2:
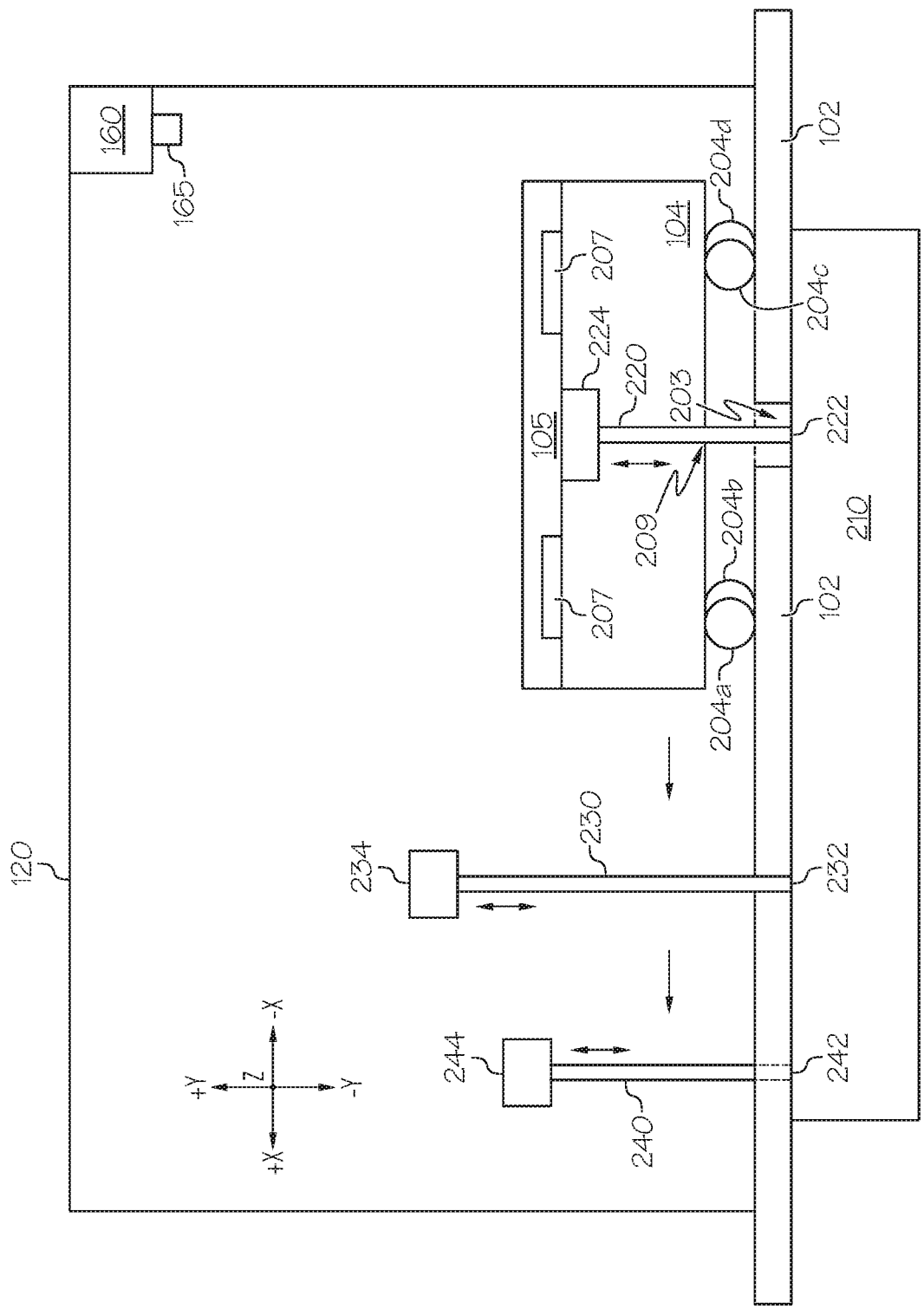
FIG. 2 schematically depicts a lengthwise side view of an illustrative sanitizer component of the assembly line grow pod and having a cart passing therethrough, according to embodiments described herein.
Figure 3:
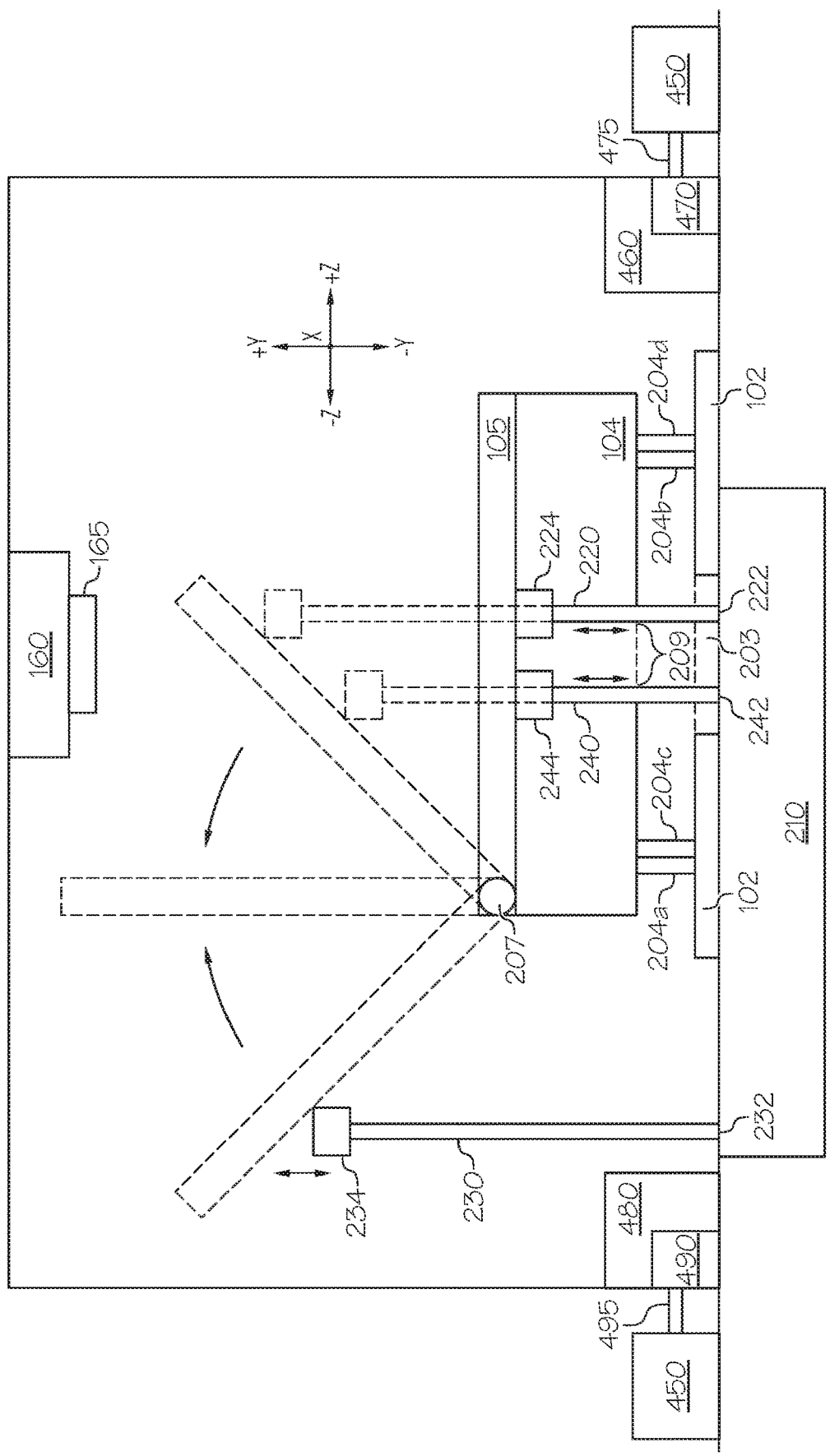
FIG. 3 schematically depicts a breadthwise side view of the illustrative sanitizer component of the assembly line grow pod and having the cart passing therethrough, according to embodiments described herein.

FIGS. 2 and 3 schematically depict a lengthwise side view and a breadthwise side view of an illustrative sanitizer component 120 of the assembly line grow pod 100 (FIGS. 1A and 1B). As shown in FIGS. 2 and 3, the sanitizer component 120 is coupled to the track 102 and processes the carts 104 passing therethrough in the +x direction of the coordinate axes of FIG. 2. While the track 102 is illustrated as a straight track in FIG. 2, the track 102 may also be a curved track. The track has one or more openings 203. As illustrated, each cart 104 includes the tray 105 and wheels 204a-204d. The wheels 204a-204d may be coupled to the track 102. The cart 104 is coupled to a tray 105 by a hinged connection 207. The cart 104 also has an aperture 209 at its bottom end.

Figure 4:
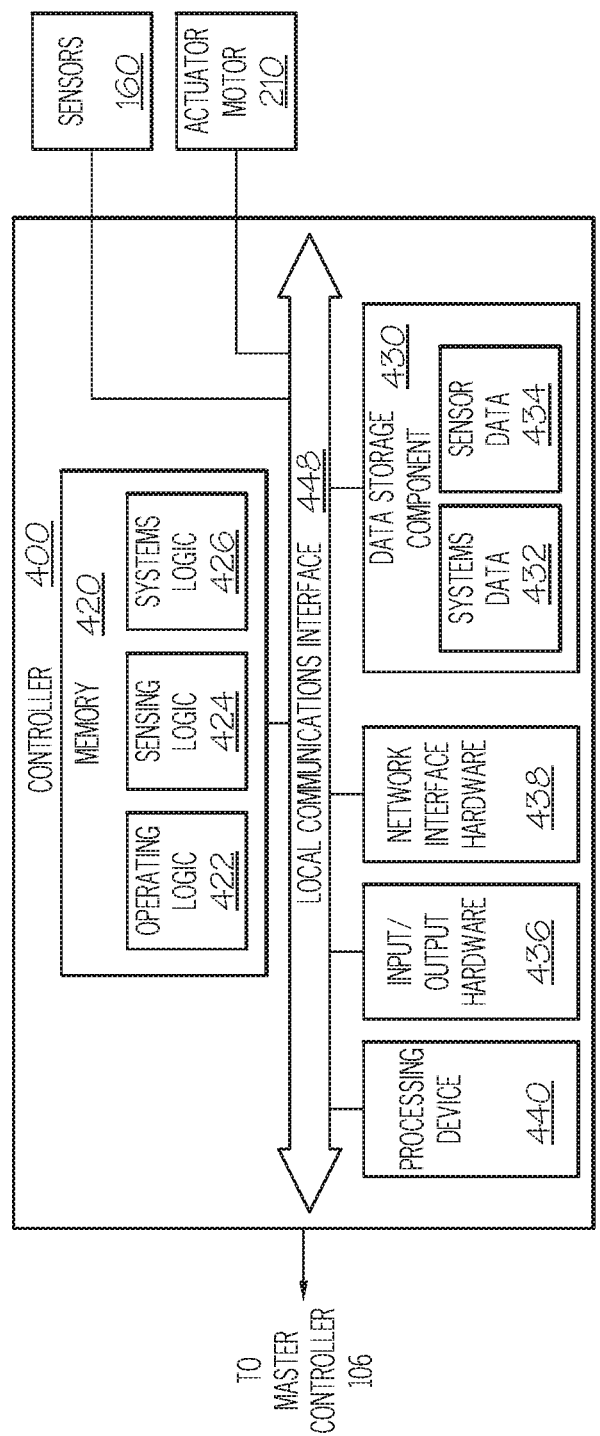
FIG. 4 schematically depicts a block diagram of illustrative components of the illustrative sanitizer component of the assembly line grow pod, according to embodiments described herein.

In the embodiments shown in FIGS. 2-4, the sanitizer component 120 has an actuator motor 210 disposed therein. The actuator motor 210 is communicatively coupled to the controller 400 (FIG. 4) to send and receive information to/from the controller 400. Still referring to FIGS. 2 and 3, the actuator motor 210 may be a drive component such as, but not limited to, a piezoelectric motor (e.g., a piezoelectric actuator), an electrical motor (e.g., a linear motor actuator), or an electromechanical motor (e.g., an electromechanical actuator). However, other drive components, such as those that use pneumatic and hydraulic components, may also be used without departing from the scope of the present disclosure. As illustrated in FIGS. 2 and 3, the actuator motor 210 is coupled to a first actuator arm 220 at a base 222 thereof. The first actuator arm 220 is positioned underneath the track 102 and is extendable through the aperture 209 and the opening 203 in the track 102 in an upwards direction (i.e. in the +y of the coordinate axes of FIG. 3). The first actuator arm 220 may act as a linear actuator, a rotary actuator, or an oscillating actuator. The first actuator arm 220 has a head 224 which contacts and rotates the tray 105 in a counterclockwise direction about the hinged connection 207 (i.e.

about an axis along a direction +x of the coordinate axes of FIG. 2). In some embodiments, the first actuator arm 220 extends a distance necessary to rotate the tray 105 by about 90 degrees or more (and in some embodiments about 180 degrees or more). That is, the first actuator arm 220 may cause the tray 105 to invert such that the contents of the tray 105 are emptied therefrom.

In some embodiments as illustrated in FIGS. 2 and 3, the actuator motor 210 is coupled to a second actuator arm 230 at a base 232 thereof. The second actuator arm 230 is located further downstream from the first actuator arm 220 along the direction +x of the coordinate axes of FIG. 2. The second actuator arm 230 has a head 234 which contacts and rotates the tray 105 in a clockwise direction about the hinged connection 207 (i.e. about an axis along a direction −x of the coordinate axes of FIG. 2). In some embodiments as illustrated in FIGS. 2 and 3, the actuator motor 210 is coupled to a third actuator arm 240 at a base 242 thereof. The third actuator arm 240 is located further downstream from the first actuator arm 220 and the second actuator arm 230 along the direction +x of the coordinate axes of FIG. 2. The third actuator arm 240 is positioned underneath the track 102 and is extendable through the aperture 209 and the opening 203 in the track 102 in a direction +y of the coordinate axes of FIG. 3. The third actuator arm 240 has a head 244 which receives and lowers the tray 105 into an original position substantially parallel to the track 102. The second actuator arm 230 and the third actuator arm 240 may also act as a linear actuator, a rotary actuator, or an oscillating actuator. While FIG. 2 depicts a single actuator motor 210 that is used to drive the first actuator arm 220, the second actuator arm 230, and the third actuator arm 240, this is merely illustrative. That is, the first actuator arm 220, the second actuator arm 230, and the third actuator arm 240 may each have an associated actuator motor that drives movement of the respective arm.

The second actuator arm 230 and the third actuator arm 240 shown in FIGS. 2 and 3 are optional and may be absent in some embodiments, without compromising the functionality of the sanitizer component 120. In those embodiments, the actuator motor 210 drives the first actuator arm 220 to rotate the tray 105 counterclockwise from a generally horizontal position (e.g. about 0 degree angle relative to the cart 104) on the track 102 to a rotated position (e.g. > about 0 degree angle relative to the cart 104) for cleaning in the sanitizer component 120. In some embodiments, the tray 105 rotates about the hinged connection 207 from greater than or equal to zero degrees to about 90 degrees (or in some embodiments about 180 degrees or more). When the actuator motor 210 drives the first actuator arm 220 in the opposite direction, the first actuator arm 220 rotates from back to a generally horizontal position (e.g. 0 degree angle) with the track 102. In at least some of the embodiments described above, rotating the tray 105 enables easier removal of materials as part of the cleaning process because the particulate materials fall out and water flows out of the tray by the force of gravity. Numerous variations of the motion of each of the actuator arms 220, 230 and 240 are hereby intended to be included without departing from the scope of the invention. In some embodiments, the first actuator arm 220, the second actuator arm 230 and the third actuator arm 240 may have separate actuator motors, instead of the single actuator motor 210.

Referring to FIG. 3, the sanitizer component 120 further includes a reservoir 460 fluidly coupled to the one or more fluid tanks 450 through an outlet 470 by a pipe 475. The reservoir 460 may be located inside or outside the sanitizer component 120. As the tray 105 is cleaned, the water used during cleaning may be collected in the reservoir 460 for recycling and subsequent uses by the sanitizer component 120. The sanitizer component 120 also includes a waste collection system 480 fluidly coupled to the one or more fluid tanks 450 through an outlet 490 by a pipe 495. The waste collection system 480 may be located inside or outside the sanitizer component 120. The waste collection system 480 collects used water and particulate material, which may be recycled for future use within the assembly line grow pod 100. The used water returns to one or more of the fluid tanks 450 through the water lines 110. The sanitizer component 120 receives the recycled water from the fluid tanks 450 for cleaning and sanitizing the carts 104 and/or trays 105 prior to reseeding. The sanitizer component 120 further includes at least one of a high pressure jet sprayer, a contact scrubber, a rinsing system, a UV radiation treatment system, a heater, and an air blower. The functions of each of these components are discussed below in greater detail.

The sanitizer component 120 may have only the actuation component in some embodiments for emptying the contents of the tray 105, though in others it may also have all the functions for cleaning the tray 105, as described below. For example, in some embodiments, the tray 105 is only emptied inside sanitizer component 120 and subsequently advanced to another chamber for cleaning. In other embodiments, the tray 105 is both emptied and cleaned inside the sanitizer component 120 to remove any particulate, plant material, etc. that may remain on the tray 105. Within some of these embodiments, the tray 105 may be emptied and rotated back to original position prior to cleaning. In other embodiments, the tray 105 may be emptied and cleaned before being rotated back to an original position. For example, the tray 105 may be rotated and the held in place by the first actuator arm 220 during a high pressure wash. When the wash is completed, the first actuator arm 220 slowly retracts and the high pressure water jet is used to press the tray 105 to its original position. The tray 105 is subsequently dried and/or sanitized.

In yet another embodiment, the tray 105 is double-sided (e.g., can receive seeds on either side) and the hinge 207 is on a rail (not shown) which is actuated by the second actuator arm 230 or another actuator arm (not shown) to slide along the top edge of the cart 104 in the +z direction (see FIG. 3). As a result, after the top side of the tray 105 is emptied in the sanitizer component 120, the hinge 207 slides along the rail in the +z direction until the bottom side and the top side of the tray 105 are flipped. This enables re-seeding of the tray 105 on the now top side (previously the bottom side) of the tray 105 while the now bottom side of the tray 105 is washed and cleaned through the aperture 209 of the cart 104 and the opening 203 of the track 102.

Referring again to FIG. 3, the sanitizer component 120 includes an automatic inspection system 160 comprising one or more sensors 165, which may be located inside or outside the sanitizer component 120. The one or more sensors 165 detect a presence of contents in the tray 105 and determine whether the tray 105 (shown in FIG. 3) is clean and ready for reseeding. Still referring to FIG. 3, the sensor 165 is a camera attached to the walls of sanitizer component 120. The camera may also be attached under the track 102 in some embodiments. The camera can capture an image of the contents in the cart 104 and the tray 105 (shown in FIG. 3). The camera may have a wide angle lens to capture the contents of more than one cart 104. In other embodiments, the sensor 165 may be a weight sensor placed on the track 102 and/or the cart 104 and measures the weight of the cart 104. The weight is indicative of the presence of contents in the cart 104 and/or the tray 105. The automatic inspection system 160 is communicatively coupled to the controller 400 and sends information from the sensor 165 to the controller 400.

FIG. 4 shows a block diagram of illustrative hardware components of the controller 400 within the sanitizer component 120. As illustrated, the controller 400 includes a memory component 420, a processing device 440, input/output hardware 436, network interface hardware 438, and a data storage component 430 (which stores systems data 432, sensor data 434, and/or other data). The controller 400 controls the automatic inspection system 160, the actuator motor 210 as well as the temperature of the water and the amount of cleaning chemicals or additives for cleaning the cart 104 and/or tray 105 in the sanitizer component 120.

Each of the components of the controller 400 may be communicatively coupled to a local communications interface 448. The local communications interface 448 is generally not limited by the present disclosure and may be implemented as a bus or other communications interface to facilitate communication among the components of the controller 400 coupled thereto.

The memory component 420 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within or outside the controller 400. The memory component 420 may store, for example, operating logic 422, sensing logic 424, and systems logic 426. The operating logic 422, the sensing logic 424, and the systems logic 426 may each include a plurality of different pieces of logic, each of which may be embodied as a computer program, firmware, and/or hardware, as an example.

The operating logic 422 may include an operating system and/or other software for managing components of the controller 400. As also discussed above, the sensing logic 424 and the systems logic 426 may reside in the memory component 420 and may be configured to provide programming instructions for providing the functionality of the sanitizer component 120, as described herein. For example, the systems logic 426 may include logic components for causing components within the sanitizer component 120 to clean the tray 105. In another example, the sensing logic 424 may include logic components for receiving data from various sensors (for example, the sensor 165 of the automatic inspection system 160) and completing one or more processes in response to the received data, as described herein.

The processing device 440 may include any processing component operable to receive and execute instructions (such as from the data storage component 430 and/or the memory component 420). Illustrative examples of the processing device 440 include, but are not limited to, a computer processing unit (CPU), a many integrated core (MIC) processing device, an accelerated processing unit (APU), a digital signal processor (DSP). In some embodiments, the processing device 440 may be a plurality of components that function together to provide processing capabilities, such as integrated circuits (including field programmable gate arrays (FPGA)) and the like.

The input/output hardware 436 may include and/or be configured to interface with microphones, speakers, a display, and/or other hardware. That is, the input/output hardware 436 may interface with hardware that provides a user interface or the like. For example, a user interface may be provided to a user for the purposes of adjusting settings, viewing a status, and/or the like.

The network interface hardware 438 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the controller 400 and other computing devices, such as user computing devices and/or remote computing devices.

The data storage component 430 may generally be any medium that stores digital data, such as, for example, a hard disk drive, a solid state drive (SSD), a compact disc (CD), a digital versatile disc (DVD), a Blu-Ray disc, and/or the like. It should be understood that the data storage component 430 may reside local to and/or remote from the controller 400 and may be configured to store one or more pieces of data and selectively provide access to the one or more pieces of data. As illustrated in FIG. 4, the data storage component 430 may store systems data 432, sensor data 434, and/or other data, as described in greater detail herein.

It should be understood that while the components in FIG. 4 are illustrated as residing within the controller 400, this is merely an example. In some embodiments, one or more of the components may reside external to the controller 400. It should also be understood that, while the controller 400 is illustrated as a single device, this is also merely an example. That is, the controller 400 may be a plurality of devices that are communicatively coupled to one another and provide the functionality described herein.

Additionally, while the controller 400 is illustrated with the various logic components (e.g., the operating logic 422, the sensing logic 424 and the systems logic 426) and data components (e.g., the systems data 432 and the sensor data 434) as separate components, this is also an example. In some embodiments, a single piece of logic (and/or a plurality of linked modules) and/or a single data component (and/or a plurality of linked modules) may also cause the controller 400 to provide the functionality described herein.

The system 1 described herein can be used advantageously to empty, clean and sanitize the tray 105 in the assembly line grow pod 100.

As the carts 104 traverse the track 102 of the assembly line grow pod 100, the plants on the tray 105 are lighted, watered, and provided nutrients. In some embodiments, the cart 104 may be advanced through the sanitizer component 120 on the track 102. In other embodiments, the cart 104 may be advanced through the sanitizer component 120 on an auxiliary track or a conveyor system, which can accept the cart 104 in one or more configurations for cleaning and sanitizing. In some embodiments, the assembly line grow pod 100 detects a growth and/or fruit output of a plant on the tray 105 and determines that harvesting is warranted, upon which the cart 104 advances through the harvester component 118, where the growth and/or fruit output is harvested. Subsequently, the cart 104 enters the sanitizer component 120.

The automatic inspection system 160 detects the presence of contents on the tray 105 on the cart 104 using the sensor 165. The sensor 165 communicates the information on the presence of contents on the tray 105 to the controller 400. The controller 400 communicates with the actuator motor 210 based on the information received from the sensor 165. The actuator motor 210, upon receiving a signal from the controller 400 actuates the first actuator arm 220. Referring to FIG. 2 and FIG. 3, as the cart 104 passes through the sanitizer component 120 on the track 102 in the direction +x of the coordinate axes of FIG. 2, the first actuator arm 220 extends through the aperture 209 and the opening 203 in the track 102 to contact the tray 105. The motion of the first actuator arm 220 rotates the tray 105 in a counterclockwise direction about an axis along a direction +x of the coordinate axes of FIG. 2. In some embodiments, the first actuator arm 220 may extend a distance necessary to rotate the tray 105 about the hinged connection 207 by 90 degrees or more (or in some embodiments about 180 degrees or more). The rotation of the first actuator arm 220 empties the contents of the tray 105. The cart 104 then advances on the track 102 through the sanitizer component 120 with the tray 105 in the rotated position until it reaches a position adjacent to the second actuator arm 230. The actuator motor 210 actuates the second actuator arm 230 and the third actuator arm 240. The second actuator arm 230 contacts and rotates the tray 105 in a clockwise direction about an axis along a direction +x of the coordinate axes of FIG. 2. The third actuator arm 240 then receives and lowers the tray 105 into its original position which is substantially parallel to the track 102.

After the contents of the cart 104 and/or tray 105 are emptied, it is inspected manually or by the automatic inspection system 160. If the cart 104 and/or tray 105 are determined to be clean they are allowed to exit the sanitizer component 120. However, if the cart 104 and/or tray 105 are determined to be unclean, they are washed and sanitized. The sanitizer component 120 implements any of a plurality of different cleaning mechanisms, using high pressure water, high temperature water, and/or other solutions for cleaning the cart 104 and/or tray 105. In some embodiments, the tray 105 may stay in a rotated position during cleaning. In those embodiments, the sanitizer component 120 cleans the tray 105 in the rotated position and restores the tray 105 back to its original position substantially parallel to the track 102 after cleaning. In other embodiments, the sanitizer component 120 washes the tray 105 after the tray 105 is rotated back in a horizontal position. Further, in some embodiments both the tray 105 and cart 104 may be in a rotated position to facilitate cleaning.

The sanitizer component 120 uses different temperatures of water and different chemicals to clean and sanitize the cart 104 and/or tray 105. The high pressure jet sprayers use high pressure streams of water (and/or other fluid), optionally with various chemicals and at various temperatures, to remove particulate material from the cart 104 and/or tray 105. The UV radiation sources focus UV light on cart 104 and/or tray 105 at wavelengths configured to kill or denature any microorganisms such as pathogens, viruses, bacteria and the like, which may adversely affect new seeds from germinating or future plant growth. The contact scrubbers include brushes or other materials to induce cleaning by way of friction. The rinsing systems use clean or neutralizing water to remove any remaining material or chemicals used during the sanitizing process. Finally, heaters and/or blowers are used to dry the cart 104 and/or tray 105.

Once the cart 104 and/or tray 105 are clean and sanitized, they advance towards exiting the sanitizer component 120. The tray 105 may be in a generally horizontal position or a rotated position. In the event the tray 105 is in a rotated position, the actuator motor 210, the second actuator arm 230 and the third actuator arm 240 operate to return the tray 105 to its original position substantially parallel to the track 102. The cart 104 and/or tray 105 subsequently advance towards the seeder component 108 for reseeding. Additional details regarding the various processes are discussed herein with respect to FIGS. 5 and 6.

Figure 5:
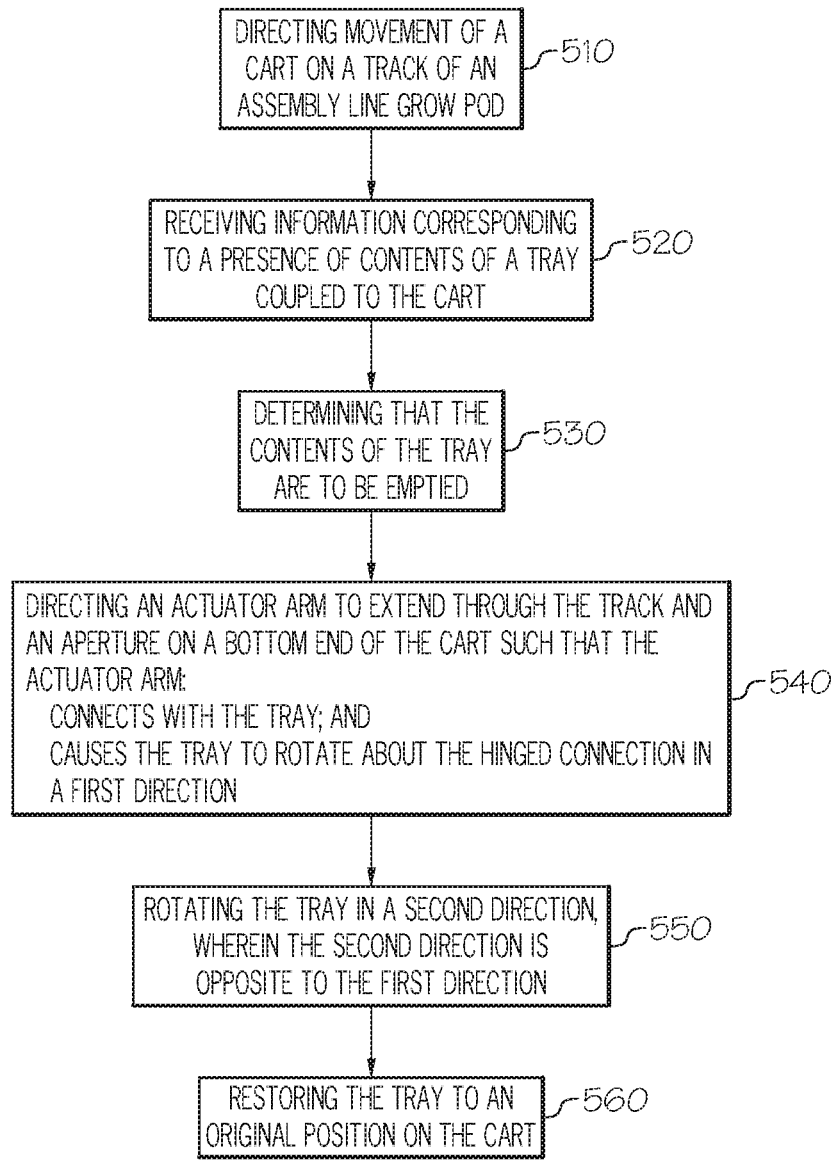
FIG. 5 depicts a flow diagram of an illustrative method for cleaning a tray within the assembly line grow pod, according to embodiments described herein.

FIG. 5 depicts a flow diagram of a method 500 for cleaning a tray 105 on a cart 104 placed within the assembly line grow pod 100. Referring also to FIGS. 1, 2 and 3, at block 510, a controller 400 directs the movement of the cart 104 on a track 102 of an assembly line grow pod 100. Accordingly, the cart 104 moves from a harvester component 118 to a sanitizer component 120 that is part of the assembly line grow pod 100. At block 520, the controller 400 receives information from sensor 165 of an automatic inspection system 160 regarding a presence of contents of the tray 105 coupled to the cart 104 by a hinged connection 207. At block 530, the controller 400 determines if the contents of the tray 105 are to be emptied.

At block 540, the controller 400 directs an actuator motor 210 to actuate a first actuator arm 220 to extend through an opening 203 in the track 102 and an aperture 209 on a bottom end of the cart 104 such that the first actuator arm 220 connects with the tray 105 and rotates the tray 105 about the hinged connection 207 in a first direction (shown in FIG. 3). As the contents of the tray 105 fall out due to gravity, the tray 105 is emptied. In some embodiments, the tray 105 is rotated 90 degrees or more (or in some embodiments about 180 degrees or more) in the first direction to empty the contents. At block 550, the controller 400 directs the actuator motor 210 to actuate a second actuator arm 230 to rotate the tray 105 about the hinged connection 207 in the opposite direction (shown in FIG. 3).

The second actuator arm 230 may be placed on the side of the track 102 within the sanitizer component 120. At block 560, the controller 400 directs the actuator motor 210 to actuate a third actuator arm 240 to receive and lower the tray 105 in order to restore it to its original position on the cart 104 (shown in FIG. 3). The third actuator arm 240 is positioned underneath the track 102 and extendable through an opening 203 in the track 102 and the aperture 209 on a bottom end of the cart 104. After the tray 105 is restored to its original position, the cart 104 and/or the tray 105 is cleaned and sanitized before being directed towards the seeder component 108.

Figure 6:
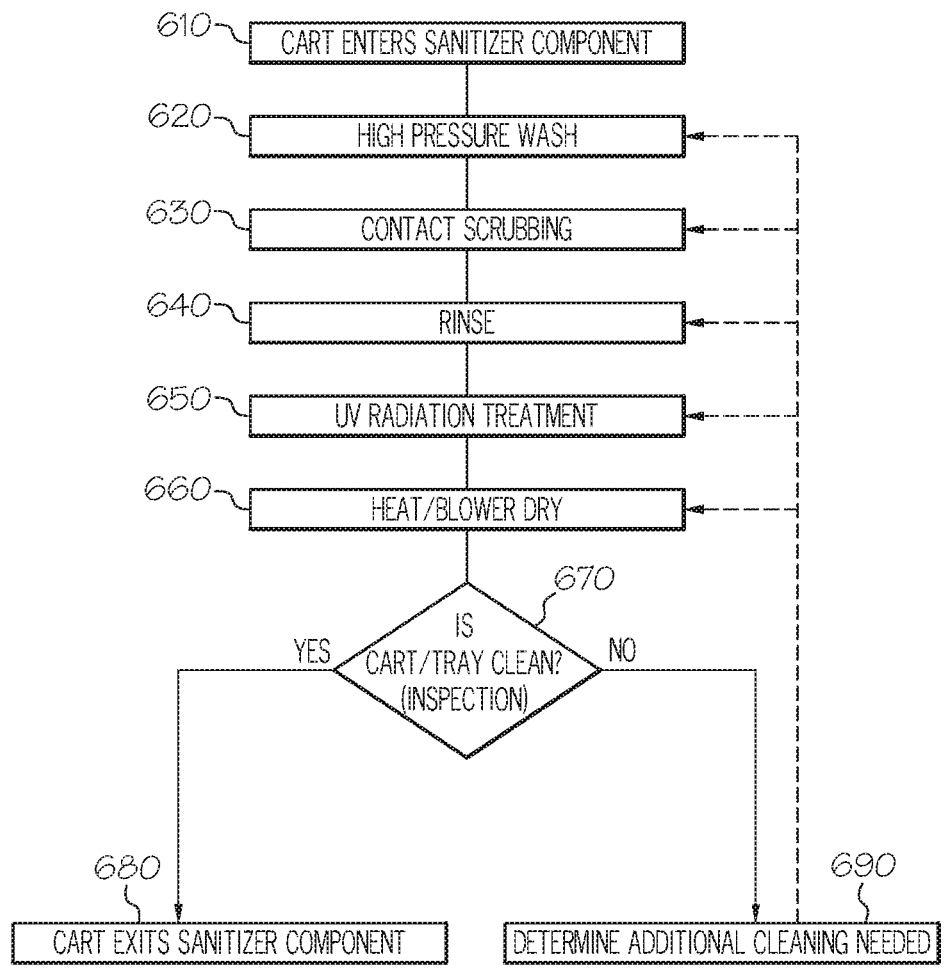
FIG. 6 depicts a flow diagram of an illustrative process of cleaning implemented by the sanitizer component, according to embodiments described herein.

FIG. 6 depicts a flow diagram of an example process for cleaning and sanitizing the cart 104 or tray 105 in the sanitizer component 120. Referring also to FIGS. 2 and 3, at block 610, the cart 104 enters the sanitizer component 120 and a tray 105 coupled to the cart 104 is emptied, as described above. A high pressure wash commences at block 620 followed by or in combination with a contact scrubbing process at block 630. The cart 104 and/or tray 105 may then be rinsed at block 640. Once particulate material is removed, the cart 104 and/or tray 105 may be subjected to a UV radiation treatment to kill microorganisms at block 650. The cart 104 and/or tray 105 are then dried by either heat or a blower or both at block 660. At block 670, an automatic inspection system 160 inspects the cart 104 and/or tray 105 for its level of cleanliness. If the automatic inspection system 160 determines the cart 104 and/or tray 105 are clean, the cart 104 exits the sanitizer component 120, at block 680. However, if the automatic inspection system 160 determines that the cart 104 and/or tray 105 require additional cleaning, then the additional type and amount of cleaning needed is determined at block 690 and the cart 104 and/or tray 105 are again subjected to the necessary cleaning block. It should be understood that this flow diagram depicts only one example with some of the various cleaning mechanisms that may be implemented by the sanitizer component 120. As such, other cleaning mechanisms are contemplated and intended to be included within the scope of the present disclosure.

As illustrated above, various systems and methods for cleaning a tray in an assembly line grow pod are disclosed. These embodiments provide post-harvest mechanisms and processes for emptying, cleaning and sanitizing a cart and/or tray in preparation for reseeding of the tray. This ensures that future seed germination and plant growth is not adversely impacted by types of plants that were previously grown in the cart and the tray and/or contaminants that may have been present. Additionally, the sanitizer component includes an automatic inspection system for inspecting and confirming the cleanliness before allowing the cart to exit the sanitizer component and proceed to reseeding. As a result, the process of growing crops on the assembly line grow pod becomes efficient and cost-effective and the rate of food production is enhanced.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems and methods for cleaning a tray in an assembly line grow pod. It should also be understood that these embodiments are merely exemplary and are not intended to limit the scope of this disclosure.

The invention claimed is:

1. A method of cleaning a tray coupled to a cart placed on a track, the method comprising:
    directing movement of the cart along the track into a sanitizer component; and
    directing movement of a first actuator arm positioned underneath the track and extendable through an opening in the track and an aperture at the bottom of the cart such that the first actuator arm extends through the opening in the track and the aperture at the bottom of the cart to contact the tray such that the tray rotates in the first direction.

2. The method of claim 1, further comprising:
    receiving, from a sensor of an automatic inspection system, information relating to a presence of contents in the tray; and
    determining that the contents in the tray are to be emptied from the tray.

3. The method of claim 1, further comprising:
    applying a high pressure wash, the high pressure wash directing water towards the tray to remove particulate material from the tray.

4. The method of claim 1, further comprising:
    contacting a contact scrubber with the tray, the contact scrubber removing particulate material from the tray.

5. The method of claim 1, further comprising:
    rinsing the tray with clean water or neutralizing water to remove material or chemicals present on the tray.

6. The method of claim 5, further comprising:
    actuating at least one of a heater and a blower, the at least one of the heater and the blower drying the tray after rinsing the tray.

7. The method of claim 1, further comprising:
    directing movement of a second actuator arm to contact the tray and rotate the tray in a second direction opposite the first direction.

8. The method of claim 7, further comprising:
    directing movement of a third actuator arm to retract and lower the tray to an original position upon contact of the tray with the third actuator arm.

9. The method of claim 1, wherein the tray rotates in the first direction to an ending position past a vertical to a ground surface.

10. A method of automatically cleaning a tray coupled to a cart placed on a track, the method comprising:
    directing, by a control device, movement of the cart into a sanitizer component along the track;
    transmitting, by the control device, one or more signals to cause a first actuator arm to extend through an opening in the track and an aperture at a bottom of the cart to contact the tray such that the tray rotates in a first direction; and
    transmitting, by the control device, one or more signals to rotate the tray in a second direction opposite the first direction.

11. The method of claim 10, further comprising:
    directing, by the control device, one or more sprayers to spray water towards the tray.

12. The method of claim 10, further comprising:
    directing, by the control device, a contact scrubber to contact the tray and remove particulate matter from the tray.

13. The method of claim 10, further comprising:
    directing, by the control device, activation of ultraviolet (UV) treatment system to focus UV light on the tray.

14. The method of claim 10, further comprising:
    directing, by the control device, at least one of a heater and a blower, the at least one of the blower drying the tray.

15. The method of claim 10, further comprising:
    transmitting, by the control device, one or more signals to actuate a second actuator arm to retract and lower the tray to an original position upon contact of the tray with the second actuator arm.

16. The method of claim 10, further comprising:
    receiving, by the control device, information from an automatic inspection system communicatively coupled to the control device, the information indicating that the tray is clean; and
    directing, by the control device, movement of the cart out of the sanitizer component via the track.

17. The method of claim 10, further comprising:
    receiving, by the control device, information from an automatic inspection system communicatively coupled to the control device, the information indicating that the tray is not clean;
    determining, by the control device, one or more additional cleaning steps; and
    directing, by the control device, one or more elements of the sanitizer component to complete the additional cleaning steps.

18. A method of cleaning a tray coupled to a cart placed on a track, the method comprising:
    directing a first actuator arm positioned underneath the track at a sanitizer component to extend through an opening in the track and an aperture at the bottom of the cart to contact the tray such that the tray rotates in the first direction; and
    removing material present on the tray.

19. The method of claim 18, further comprising:
directing movement of a second actuator arm to contact the tray and rotate the tray in a second direction opposite the first direction.

20. The method of claim 19, further comprising:
directing movement of a third actuator arm to retract and lower the tray to an original position upon contact of the tray with the third actuator arm.

\* \* \* \* \*